US010581762B2

United States Patent
Shpiner et al.

(10) Patent No.: US 10,581,762 B2
(45) Date of Patent: Mar. 3, 2020

(54) PACKET SCHEDULING IN A SWITCH FOR REDUCING CACHE-MISS RATE AT A DESTINATION NETWORK NODE

(71) Applicant: Mellanox Technologies TLV Ltd., Raanana (IL)

(72) Inventors: Alex Shpiner, Nesher (IL); Tal Anker, Ramat Gan (IL); Matty Kadosh, Hadera (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 107 days.

(21) Appl. No.: 15/832,806

(22) Filed: Dec. 6, 2017

(65) Prior Publication Data

US 2019/0173810 A1  Jun. 6, 2019

(51) Int. Cl.
  *G06F 15/16* (2006.01)
  *H04L 12/861* (2013.01)
  *G06F 15/173* (2006.01)
  *H04L 12/863* (2013.01)
  *H04L 29/08* (2006.01)

(52) U.S. Cl.
  CPC .... *H04L 49/9057* (2013.01); *G06F 15/17331* (2013.01); *H04L 47/624* (2013.01); *H04L 47/6225* (2013.01); *H04L 67/1097* (2013.01); *H04L 67/2842* (2013.01)

(58) Field of Classification Search
  CPC .................................................. H04L 49/9057
  USPC ........................................................ 709/212
  See application file for complete search history.

(56) References Cited

U.S. PATENT DOCUMENTS

| | | | |
|---|---|---|---|
| 6,956,818 B1 | 10/2005 | Thodiyil | |
| 8,412,831 B2 | 4/2013 | Detrick et al. | |
| 8,457,142 B1 | 6/2013 | Goldman et al. | |
| 9,055,124 B1 * | 6/2015 | Hill | H04L 65/403 |
| 9,313,047 B2 | 4/2016 | Michels et al. | |
| 2002/0007392 A1 * | 1/2002 | Buddhikot | H04N 7/165 |
| | | | 709/203 |

(Continued)

OTHER PUBLICATIONS

"Supplement to InfiniBand™ Architecture Specification", vol. 1, Release 1.2.1, Annex A16: RDMA over Converged Ethernet (RoCE), InfiniBand Trade Association, 19 pages, Apr. 6, 2010.

(Continued)

*Primary Examiner* — Anthony Mejia
(74) *Attorney, Agent, or Firm* — Kligler & Associates Patent Attorneys Ltd

(57) ABSTRACT

A network switch includes switch circuitry and multiple ports. The ports are configured to communicate with a communication network. The switch circuitry is configured to receive via the ports multiple packets, which are destined to a destination network node and which specify attributes used by the destination network node as cache keys for on-demand fetching of context items into a cache memory of the destination network node, to control a rate of fetching the context items into the cache memory at the destination network node, by ordering the received packets in a sequence, based on the attributes of the respective packets, using an ordering criterion that aims to place packets that access a common context item in proximity to one another in the sequence, and to forward the received packets to the destination network node, via the ports, in accordance with the ordered sequence.

20 Claims, 3 Drawing Sheets

(56) References Cited

U.S. PATENT DOCUMENTS

| | | | |
|---|---|---|---|
| 2002/0152327 A1 | 10/2002 | Kagan et al. | |
| 2003/0103514 A1* | 6/2003 | Nam | H04L 47/39 370/412 |
| 2003/0152078 A1* | 8/2003 | Henderson | H04L 29/06 370/389 |
| 2004/0213266 A1 | 10/2004 | Willhite et al. | |
| 2006/0190641 A1 | 8/2006 | Routlife et al. | |
| 2006/0221990 A1* | 10/2006 | Muller | G06F 13/28 370/412 |
| 2010/0274876 A1 | 10/2010 | Kagan et al. | |
| 2012/0117325 A1* | 5/2012 | Chen | H04L 67/2842 711/118 |
| 2013/0031312 A1* | 1/2013 | Jones | G06F 12/0862 711/137 |
| 2013/0031313 A1* | 1/2013 | Ryan | G06F 12/0862 711/137 |
| 2013/0103911 A1* | 4/2013 | Bulut | G06F 12/0866 711/144 |
| 2014/0013054 A1* | 1/2014 | Chang | G06F 12/0895 711/122 |
| 2015/0189033 A1* | 7/2015 | Han | H04L 67/2842 709/203 |

OTHER PUBLICATIONS

"Supplement to InfiniBandTM Architecture Specification", vol. 1, Release 1.2.1, Annex A17: RoCEv2, InfiniBand Trade Association, 23 pages, Sep. 2, 2014.

* cited by examiner

PACKET SCHEDULING IN A SWITCH FOR REDUCING CACHE-MISS RATE AT A DESTINATION NETWORK NODE

TECHNICAL FIELD

Embodiments described herein relate generally to communication systems, and particularly to methods and systems for scheduling packet transmission in a switch for reducing cache-miss events at a destination network node.

BACKGROUND

Traffic throughput is an important performance measure is communication networks. Throughput bottlenecks may occur within network elements, e.g., switches or routers, end nodes, or both.

Methods for managing network throughput are known in the art. For example, U.S. Pat. No. 9,313,047 describes handling network data packets classified as being high throughput and low latency with a network traffic management device. Packets are received from a network and classified as high throughput or low latency based on packet characteristics or other factors. Low latency classified packets are generally processed immediately, such as upon receipt, while the low latency packet processing is strategically interrupted to enable processing coalesced high throughput classified packets in an optimized manner.

I/O devices, such as network interface controllers (NICs), usually use physical memory addresses in order to access host memory, but some virtual memory addressing techniques for I/O have been described in the patent literature. For example, U.S. Patent Application Publication 2010/0274876, whose disclosure is incorporated herein by reference, describes an I/O device, which is configured to receive, over a network, data packets associated with I/O operations directed to specified virtual addresses in the memory. Packet processing hardware in the I/O device is configured to translate the virtual addresses into physical addresses and to perform the I/O operations using the physical addresses.

InfiniBand™ (IB) is a switched-fabric communications link primarily used in high-performance computing. It has been standardized by the InfiniBand Trade Association. Computing devices (host processors and peripherals) connect to the IB fabric via a network interface controller, which is referred to in IB parlance as a channel adapter. Host processors (or hosts) use a host channel adapter (HCA), while peripheral devices use a target channel adapter (TCA). IB channel adapters implement various service types and transport protocols, including Remote Direct Memory Access (RDMA) read and write operations. Details of a hardware-based implementation of IB RDMA are provided, for example, in U.S. Patent Application Publication 2002/0152327, whose disclosure is incorporated herein by reference.

RDMA over Converged Ethernet (RoCE) is a network protocol that supports RDMA over an Ethernet network. RoCE is specified, for example, in "Supplement to Infini-Band™ Architecture Specification, Volume 1, Release 1.2.1, Annex A16: RDMA over Converged Ethernet (RoCE)," InfiniBand Trade Association, Apr. 6, 2010, which is incorporated herein by reference. A version of the RoCE protocol that is suitable for IP-based networks is referred to as RoCEv2. The RoCEv2 version is specified, for example, in "Supplement to InfiniBand™ Architecture Specification, Volume 1, Release 1.2.1, Annex A17: RoCEv2," InfiniBand Trade Association, Sep. 2, 2014, which is incorporated herein by reference.

SUMMARY

An embodiment that is described herein provides a network switch that includes switch circuitry and multiple ports. The ports are configured to communicate with a communication network. The switch circuitry is configured to receive via the ports multiple packets, which are destined to a destination network node and which specify attributes used by the destination network node as cache keys for on-demand fetching of context items into a cache memory of the destination network node, to control a rate of fetching the context items into the cache memory at the destination network node, by ordering the received packets in a sequence, based on the attributes of the respective packets, using an ordering criterion that aims to place packets that access a common context item in proximity to one another in the sequence, and to forward the received packets to the destination network node, via the ports, in accordance with the ordered sequence.

In some embodiments, the network switch further includes multiple queues for storing packets awaiting transmission to the communication network, and the switch circuitry is configured to order the received packets by distributing the received packets among the multiple queues so that at least some of the received packets that are associated with a same cache key are distributed to a common queue. In other embodiments, the switch circuitry is configured to scan the multiple queues and to read from each queue visited multiple packets, if available, before switching to read a subsequent queue among the multiple queues. In yet other embodiments, the switch circuitry is configured to read the multiple queues in accordance with a Deficit Round Robin (DRR) schedule scheme that assigns to each of the multiple queues a quanta parameter of multiple packets.

In an embodiment, the received packets are associated with multiple respective priority levels, and the switch circuitry is configured to distribute the received packets to multiple respective queue-groups that each includes two or more of the multiple queues, based on the respective priority levels, and to read multiple packets from a selected queue in one queue-group before switching to selecting a subsequent queue for reading in another queue-group. In another embodiment, the switch circuitry is configured to receive additional packets that are destined to the destination network node, the additional packets require no access to any cached context item at the destination network node, and to distribute the additional packets to a dedicated queue that is separate from the queues allocated for storing packets to be ordered. In yet another embodiment, the switch circuitry is configured to read the queues by alternating reading one or more packets from a selected queue among the queues storing the packets to be ordered, and one or more packets from the dedicated queue.

In some embodiments, the context items in the cache memory include information for translating between destination virtual addresses carried in headers of the received packets and physical addresses of a memory of the destination network node in which a payload part of the received packets is to be stored, and the attributes used by the destination network node as the cache keys include the virtual addresses. In other embodiments, the received packets are organized in Remote Direct Memory Access (RDMA) messages for directly accessing data in the memory of the destination network node. In yet other embodiments, the communication network includes an InfiniBand fabric, and the RDMA messages include messages communicated in accordance with a RDMA over Converged Ethernet (RoCE) protocol.

There is additionally provided, in accordance with another embodiment that is described herein, a method for communication, including, in a network switch that includes multiple ports for communicating with a communication network, receiving via the ports multiple packets, which are destined to a destination network node and which specify attributes used by the destination network node as cache keys for on-demand fetching of context items into a cache memory of the destination network node. A rate of fetching context items into the cache memory at the destination network node is controlled by the network switch, by ordering the received packets in a sequence, based on the attributes of the respective packets, using an ordering criterion that aims to place packets that access a common context item in proximity to one another in the sequence. The packets are forwarded to the destination network node, via the ports, in accordance with the ordered sequence.

These and other embodiments will be more fully understood from the following detailed description of the embodiments thereof, taken together with the drawings in which:

DETAILED DESCRIPTION OF EMBODIMENTS

Overview

Figure 1:
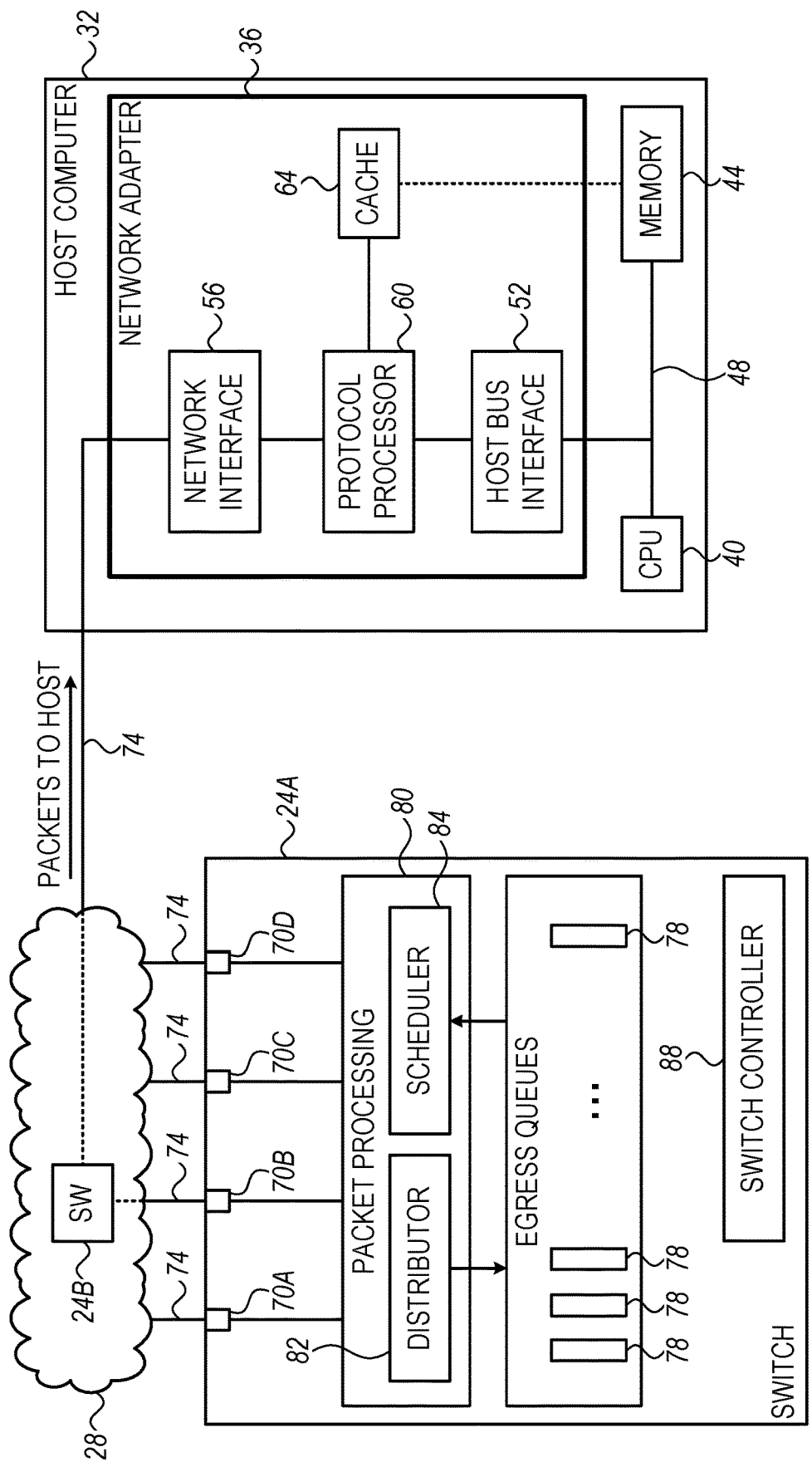
FIG. 1 is a block diagram that schematically illustrates a network switch that forwards packets to a target network node, in accordance with an embodiment that is described herein.

In various computing and other applications, network nodes communicate over a packet network that comprises interconnected network elements such as switches or routers. The network nodes, e.g., host computers or devices of various types, connect to the packet network using an I/O device, referred to as a network adapter. In InfiniBand (IB) networks the I/O device via which a host computer interfaces the IB fabric is also referred to as a Host Channel Adapter (HCA). The network adapter at the receiving end is also referred to herein as a "destination network adapter."

Embodiments that are described herein provide methods and systems for scheduling packet transmission in a network element so as to reduce the rate of cache-miss events at the destination network node. The disclosed techniques require no modification to the destination network node itself.

Consider a network node that comprises a host computer equipped with a CPU and a host memory. The network node connects to a communication network such as an IB fabric or an Ethernet network using a network adapter. The network adapter typically processes incoming and outgoing packets by inspecting certain fields in headers of the packets.

The processing of some packets at the destination network node is based on context information held in the destination network node. A piece of context information defined for processing packets that share some common attribute(s), e.g., packets that belong to a common flow, is referred to herein as a "context item." A context item can define, for example, information required for translating virtual addresses carried in the packets headers to physical addresses of the host memory. In some embodiments, context items are implemented as data structures in memory.

For fast access, the context items should reside internally to the destination network adapter. Due to chip area and power consumption constraints, however, the network adapter can usually store only a small portion of the entire context items.

In some embodiments, all of the context items are stored in the host memory (which has a large storage space), and the network adapter comprises a relatively small-sized cache memory that stores, at any given time, only a partial subset of the context items. The context items in the cache memory are accessed, or searched for, using respective cache keys. When a context item for processing a given packet is unavailable within the cache memory, the missing context item is fetches from the host memory into the cache memory. Such an event is referred to as "cache-miss."

Packets that arrive at the network adapter within some time interval may require access to different context items that are possibly not all available concurrently in the cache memory. Since fetching context items from the host memory delays packet processing, a high cache-miss rate limits the traffic throughput that the network adapter can handle, which in turn, may result in packet drop at the network adapter, or cause backpressure and possibly congestion to the switch connecting directly to the destination network adapter and/or to other switches upstream.

In the disclosed embodiments, the switch controls the cache-miss rate at the destination network adapter, by ordering the packets to be forwarded to the destination network node in a sequence, based on the certain attributes carried in headers of the packets, which attributes are used by the destination network node as cache keys for on-demand fetching of context items into the cache memory of the destination network node. The underlying ordering criterion aims to place packets that access a common context item in proximity to one another in the sequence. Such an ordering approach reduces the cache-miss rate at the destination network node, even though the destination network node is unaware of this packet ordering.

In some embodiments, the switch comprises multiple queues for storing packets awaiting transmission to the network. The switch applies the ordering criterion by (i) distributing the received packets among the queues so that at least some of the packets that are associated with a same cache key are distributed to a common queue, and (ii) scheduling transmission of the queued packets to the network by scanning the queues and reading multiple packets (if available) from each queue visited, before switching to read a subsequent queue.

In an embodiment, to distribute a packet, the switch calculates a hash function over certain header fields of the packet such as flow identifier and one or more attributes that are used by the destination network node as a cache key for the cache memory. In another embodiment, the switch schedules reading the queues in accordance with a Deficit Round Robin (DRR) scheme. The DRR scheme assigns to each of the queues a quanta parameter of multiple packets.

The quanta should be selected carefully, because a large quanta value typically results in a low cache-miss rate but may cause queue starvation.

In some embodiments, the received packets are associated with multiple respective priority levels, in which case the switch distributes the received packets to multiple respective queue-groups that each comprises two or more queues, based on the respective priority levels, and reads multiple queued packets from a selected queue in one queue-group before switching to another queue-group.

In some embodiments, controlling the cache-miss rate is relevant to only some of the communication protocols supported by the network, and the switch applies packet ordering only to packets of the relevant protocols. For example, the switch handles Remote Direct Memory Access (RDMA) over Converged Ethernet (RoCE) packets as described above, and queues Transmission Control Protocol (TCP) packets in a separate single queue.

In the disclosed techniques, packet ordering in a switch improves the cache hit ratio at the destination. Because of the ordering, packets distributed to the same egress queue are likely use the same cache key, in contrast to packets distributed to different egress queues. As a result, the first packet transmitted in a burst from the same queue may cause a cache miss at the destination, which results in fetching the missing context to the cache memory. Subsequent packets in the burst, however, will have this context available in the cache memory and therefore can be processed with minimal delay.

In the disclosed techniques, a network element (e.g., a switch) that resides along the path to the receiving network node, indirectly controls the cache-miss rate at the destination network node. To this end, the network element gathers packets that access a common context item in the cache memory of the destination network node, in close proximity in the sequence of egressed packets. As a result, the traffic throughput that the network adapter can handle improves, which also improves the overall network performance.

System Description

FIG. 1 is a block diagram that schematically illustrates a network switch 24A that forwards packets to a host computer 32, in accordance with an embodiment that is described herein. The configuration depicted in FIG. 1 can be used in various applications such as data centers, High Performance Computing (HPC), network storage and the like. Network switches 24 in FIG. 1, are part of a packet network 28. A network switch is also referred to herein simply as a "switch" for brevity.

Host computer 32 is a network node that comprises an I/O device, i.e., a network adapter 36, e.g., an IB HCA, or a Network Interface Controller (NIC), for communication with packet network 28, such as an IB fabric or an Ethernet network, for example. The host computer comprises a host processor 40, which typically comprises a general-purpose Central Processing Unit (CPU), and a system memory 44, connected to the host processor by a host bus 48, under the control of a suitable memory controller (not shown), as is known in the art. CPU 40 typically runs an operating system and software applications. System memory 44, also referred to as a "host memory," holds program instructions and application data, as well as metadata structures that are accessed and used by network adapter 36 in managing data transfer operations. The host processor, system memory and associated components are referred to collectively as a "host device."

Network adapter 36 is connected to host bus 48 of the host computer by a host bus interface 52, comprising circuitry that enables the network adapter to read and write data directly from and to system memory 44. Network interface circuitry 56 in network adapter 36 connects to packet network 28. Protocol processing circuitry 60 in the network adapter performs transport-layer processing functions in accordance with instructions received from host processor 40. These functions include constructing data packets containing data gathered from system memory for transmission over packet network 28, as well as receiving and processing incoming packets from packet network 28 and scattering the data contained in the packets to system memory 44. The functions of the network adapter are typically implemented in dedicated hardware circuits, such as those described in the above-mentioned U.S. Patent Application Publication 2002/0152327.

In some embodiments, client processes running on host computer 32 communicate with the transport layer of packet network 28 via network adapter 36 by manipulating a transport service instance, known as a "queue pair" (QP), which is made up of a send work queue and a receive work queue. A given client may open and use multiple QPs simultaneously.

Typically, a given network adapter will serve multiple QPs concurrently, serving both as a requester—transmitting request messages and receiving responses on behalf of local clients—and as a responder—receiving request messages from other network adapters and returning responses accordingly. Request messages include, inter alia, RDMA write and send requests, which cause the responder to write data to a memory address at its own end of the link, and RDMA read requests, which cause the responder to read data from a memory address and return it to the requester. RDMA read and write requests specify the memory range to be accessed by the network adapter in the local memory of the responder, whereas send requests leave the choice of memory range to the responder.

In the present embodiment, the memory range for at least some RDMA requests is assumed to be specified in terms of virtual memory addresses, which are translated by network adapter 36 into machine addresses (i.e., physical addresses) in system memory 44, as described hereinbelow. The techniques described herein are applicable to various types of I/O requests that use virtual memory addresses.

Network adapter 36 further comprises a cache memory 64. The storage space of cache memory 64 is typically much smaller than that of system memory 44. For example, the cache memory may comprise several Megabytes of storage space, whereas the system memory may comprise several Gigabytes of storage space. In cache memory 64, data is typically organized in granularity of cache lines, wherein each cache line is accessible separately using a respective cache key. In some embodiments, each cache line stores one or more context items. In other embodiments, a context item may be stored across more than a single cache line. In the present context, we generally assume that a given cache key is used for accessing a respective context item. Alternatively, other suitable cache accessing schemes can also be used.

In some disclosed embodiments, cache memory 64 stores context items, which protocol processor 60 accesses for processing packets received from the packet network via network interface 56. A single context item may reside within one or more (typically successive) cache lines of cache memory 64. In an example embodiment, the cache line size is 64 bytes, and the size of the context items is 128 bytes.

In a typical network node configuration, host computer 32 stores in system memory 44 all of (or a large portion of) the context items required for processing packets received from packet network 28. When the context item required for processing a received packet by protocol processor 60 is unavailable in cache memory 64, the missing context item is first fetched from system memory 44 into cache memory 64, and then protocol processor 60 uses the recently fetched context item to process the packet. Note that the missing context item may be fetched together with several other context items. An event of a missing context item in the cache is referred to as a "cache miss event," or simply "cache miss," for brevity. The host computer can use any suitable scheme for evicting data from the cache memory and for fetching data from the system memory into the cache memory, as known in the art.

Protocol processor 60 of the network adapter accesses a context item in cache memory 64 using a cache key specified by certain attributes in a header part of the respective packet. For example, the context items comprise information for translating between destination virtual addresses and respective physical addresses of system memory 44, in which case the packet attribute that is used by the destination network node as the cache key comprises a destination virtual address to be translated. Alternatively or additionally, in remote access applications such as in RDMA and RoCE, the attribute that is used by the destination network node as the cache key comprises a destination QP number or a RDMA message number.

Network adapter 36 supports flow control with the switch to which the network switch connects. Network adapter 36 may apply any suitable flow control such as, for example, credit-based or pause-based flow control. Depending on mode of operation selected, when the network adapter has insufficient storage space for the incoming packets, the network adapter either drops subsequent received packets or signals to the switches upstream to stop forwarding the packets toward the destination network node.

Switch 24A comprises multiple ports 70 for connecting to packet network 28, which comprises additional switches such as switch 24B. A port 70 can serve as an input port for receiving packets from the network, as an output port for transmitting packets into the network, or both. Switches such as 24A and 24B connect physically to other network switches, to network nodes (e.g., such as host computer 32) or to other end devices, via links 74. In the present example, switch 24A receives packets from the network, e.g., via one or more of ports 70, and forwards at least some of the received packets to host computer 32 via one or more ports 70. In the present example, the path from switch 24A to the host computer comprises one or more other switches such as switch 24B, and switch 24A forwards packets to host computer 32 via port 70B. In other embodiments, switch 24A is the last switch along the path, in which case switch 24A connects directly to the network adapter of the host computer.

Switch 24A typically comprises suitable means for handling flow control, as known in the art. For example, switch 24A may suspend forwarding packets via a given port in response to receiving an indication that the buffer of the element receiving these packets is overfilled. Switch 24A can apply any suitable flow control method such as, for example, credit-based or pause-based flow control. The flow control method applied by switch 24A should match the flow control method applied by the destination network node.

Switch 24A comprises multiple egress queues 78 for storing packets awaiting transmission to packet network 28. Typically, switch 24A forwards each received packet to a relevant egress queue, e.g., based on destination information carried in the packet's headers. Packets that are forwarded for transmission via a given port may be stored in one or more egress queues 78.

Switch 24A comprises a packet processing module 80 for processing incoming and outgoing packets. In the ingress direction, packet processing module 80 applies to the packets received various processing such as verifying the correctness of the data in the packet payload, packet classification and prioritization, and routing. To this end, the packet processing module typically checks certain fields in the packets headers such as source and destination addresses, port numbers, and the underlying network protocol used.

In some embodiments, packet processing module 80 comprises a distributor 82 and a scheduler 84. Distributor 82 forwards the received packets to egress queues 78 according to some distribution policy. In the egress direction, scheduler 84 schedules the transmission of packets queued in egress queues 78 via respective ports 70 using a scheduling or arbitration scheme. Example embodiments implementing distributor 82 and scheduler 84 will be described in detail below.

Switch 24A further comprises a switch controller 88, which performs various management and packet-processing functions of switch 24A. For example, switch controller 88 configures a desired routing plan.

The configurations of switch 24A, packet network 28 and host computer 32 shown in FIG. 1 are example configurations, which are chosen purely for the sake of conceptual clarity. In alternative embodiments, any other suitable switch, communication network and host computer (or other network node or device) configurations can be used. Some elements of switch 24A, such as distributor 82 and scheduler 84, may be implemented in hardware, e.g., in one or more Application-Specific Integrated Circuits (ASICs) or Field-Programmable Gate Arrays (FPGAs). Additionally or alternatively, some switch elements, for example switch controller 88, can be implemented using software, or using a combination of hardware and software elements. Egress queues 78 may be implemented using any suitable memory, such as Random Access Memory (RAM).

In the context of the present patent application and in the claims, the term "switch circuitry" refers to all the elements of switch 24A excluding ports 70. In FIG. 1, the switch circuitry comprises packet processing module 80, egress queues 78, and switch controller 88.

In some embodiments, some of the functions of the switch circuitry, e.g., switch controller 88, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Ordering Packets in a Switch for Reducing Cache-Miss Rate in Receiving Network Adapter Consider a switch that forwards at least some of the packets it receives from the network to a destination network node, e.g., a host computer. Some of the received packets that are destined to the destination network node may belong to multiple different flows originating in one or more source nodes coupled to the network. For example, the packets may be comprised in messages that the source nodes send to the destination network node. In the context of the present disclosure, the term "flow" refers to a sequence of packets sent from a source to a destination over the packet network.

The sequence of packets at the output port of the switch may contain packets belonging to multiple different flows. When the size of the cache memory is insufficient for concurrently storing the context items for processing packets arriving at the destination network node during some time interval, cache-miss events may occur.

In some embodiments, the cache-miss rate at the destination network node is controlled by the switch by properly ordering the packets forwarded to the destination network node. Specifically, the switch orders the packets in a sequence so that packets that access a common context item in the cache memory are placed in proximity to one another in the sequence. For example, the ordering criterion may require that a minimal predefined number of packets (if available) that require a common context item for their processing will be placed successively in the sequence.

Consider, for example, three flows denoted FL1, FL2 and FL3 destined to the destination network node, wherein processing packets of these flows at the destination network adapter require respective context items CN1, CN2 and CN3. A flow identifier can be used as a cache key for accessing the context items. In this example we assume that the cache memory at the network adapter can store at any given time only two context items. In an example embodiment, the switch orders the packets of the three flows, for transmission to the network, by transmitting to the network N packets from each flow before switching to a subsequent flow. The sequence of packets transmitted via the output port is given by {FL1(N), FL2(N), FL3(N), FL1(N), FL2(N), . . . } and so on. Using such an ordering, a cache miss event occurs only once per 2N packets. Selecting N to be a large integer improves the cache-miss rate, but results in a large delay between chunks of the same flow in the sequence.

Figure 2:
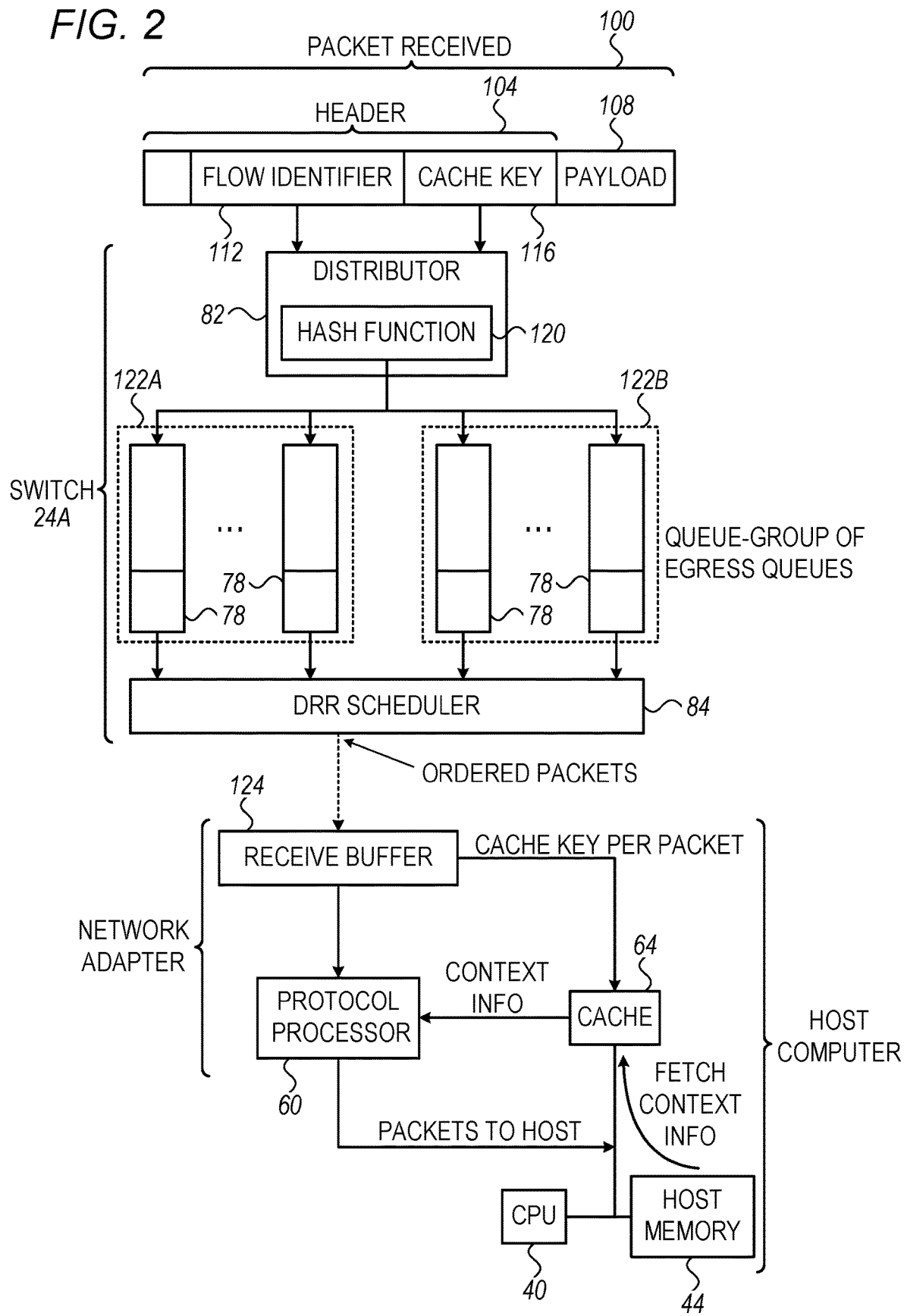
FIG. 2 is a diagram that schematically illustrates packet processing elements in a network switch and in a destination network node, in accordance with an embodiment that is described herein.

FIG. 2 is a diagram that schematically illustrates packet processing elements in a switch and in a destination network node, in accordance with an embodiment that is described herein. In the present example, the switch comprises switch 24A, and the network node comprises host computer 32.

In FIG. 2, switch 24A receives from packet network multiple packets, e.g., such as packet 100, and forwards the packets destined to the network node in an ordered sequence for indirectly reducing cache-miss rate at the destination network node. In an embodiment, the packets arriving at the destination network node are initially stored in a receive buffer 124 before being processed by protocol processor 60 using respective context items in cache memory 64.

The packets received in switch 24A, include packets such as packet 100 comprising a header 104 and a payload 108. Header 104 comprises various fields such as flow identifier 112 and an attribute 116 to be used in the destination network node as a cache key. In the description that follows, the terms "cache key" and "attribute" (which is used by the destination network node as the cache key) are used interchangeably, and both terms refer to the header field numbered 116 in the figure. The flow identifier identifies the flow to which the packet belongs. In IB networks, the flow identifier may comprise a QP number associated with the relevant queue pair at the destination network adapter. In Ethernet and IP networks, the flow identifier may comprise a 5-tuple that comprises source and destination addresses, source and destination ports and the underlying protocol used.

The cache key specified by attribute 116 comprises a key that is used at the destination network adapter for accessing, in cache memory 64, the context item required for processing packet 100 by protocol processor 60. In an embodiment, the attribute in the packet's header that is used by the destination network node as the cache key comprises a destination virtual address to be translated (using a respective cached context item) into a physical address in system memory 44 for storing payload 108 of the received packet. In other embodiments, the attribute that is used by the destination network node as the cache key comprises a destination QP number or a RDMA message number.

In some embodiments, cache memory 64 comprises multiple cache tables of context items, wherein each cache table is accessible via a different respective attribute serving as a cache key. For example, cache memory 64 may comprise a cache table that is accessed using a QP number as a cache key, and another cache table that is accessed using a RDMA message number as the cache key. In such embodiments, the processing of a given packet may require accessing one or more of the multiple cache tables. If, for example, the cache table accessed using a given attribute as a cache key (e.g., the QP number) is sufficiently large to store a number of context items that is large compared to the expected number of context items needed to be cached concurrently, the benefit of ordering the packets based on this attribute is low. In this case, another attribute can be used for optimizing the accessing to another (smaller) cache table.

In some embodiments, switch 24A serves the packets received according to their order of arrival. The switch distributes received packets that are destined to network node 32 (such as packet 100) to one or more egress queues 78 using distributor 82, and schedules the transmission of packets queued in egress queues 78 to the network using scheduler 84.

In some embodiments, distributor 82 distributes packets to egress queues 78 by calculating a hash function 120 over one or more fields of the packets headers. For example, each egress queue 78 may be associated with a respective queue identifier (e.g., an integer number or a pointer) and the calculated result of the hash function comprises the queue identifier of the selected queue. Hash function 120 may comprise any suitable hash function, such as, for example, the SHA-1 hash function.

In some embodiments, the distributor calculates hash function 120 over both flow identifier 112 and the attribute serving as cache key 116. Such a distribution scheme distributes packets that belong to a common flow and that access the same context item in cache memory 64 to a common egress queue. In an embodiment, the flow identifier is also part of the cache key used for accessing the cache memory at the destination. In another embodiment, a cache key may comprise the destination memory address, even when this address is not used as a flow identifier.

Note that since the number of flows supported by the switch is typically much larger than the number of available egress queues, a single egress queue may store packets belonging to multiple respective flows. By using the described distribution scheme, however, the packets queued per each egress queue are associated with a relatively small number of different (flow, cache key) pairs. Therefore, packets drawn successively from a given egress queue will typically cause only little or no cache miss events at the destination network adapter. In general, distributing the packets received in a switch among a larger number of egress queues, typically corresponds to a lower cache-miss rate at the destination.

Scheduler 84 may schedule the transmission of queued packets to the network in various ways. In the present example, scheduler 84 comprises a Deficit Round Robin (DRR) scheduler. The DRR scheduler scans egress queues 78 in a cyclic order, and reads multiple packets from each queue before switching to the next egress queue. The amount of data read from an egress queue whose turn has arrived is a configurable parameter of the DRR scheduler, referred to as a "quanta" parameter. The quanta parameter may be defined in any suitable granularity such as, for example, in terms of number of packets or number of bytes.

Selecting the quanta value enables a tradeoff between the expected cache-miss rate at the destination network node and the amount of temporal starvation caused to egress queues to be served subsequently. The amount of queue starvation can be defined, for example, in terms of time delay between successive serving (i.e., reading packets out) of the same queue. As such, a large quanta value results in low cache-miss rate but may cause a high level of egress queue starvation. In an embodiment, switch 24A assigns different quanta values to different respective egress queues 78. Alternatively, the switch assigns a common quanta value to multiple egress queues. In some embodiments, the quanta value is configured sufficiently small to meet network latency requirements.

In some embodiments, at least some of the packets received in switch 24A and that are destined to network node 32 are associated with multiple respective priority levels, e.g., for providing differentiated services. The priority level of a packet is typically carried in header 104 of the packet (not shown). In general, packets having a high priority level should be scheduled for transmission to the network before packets having a low priority level.

In some embodiments, switch 24A allocates one or more queue-group 122 of multiple egress queues 78 per each priority level. The queue-groups may comprise different respective numbers of egress queues. In such embodiments, distributor 82 selects respective queue-groups for the received packets, based on the respective priority levels, and distributes the received packets within the selected queue-groups, e.g., using a hash function, as described above. Distributor 82 may use the same or different hash functions for different queue-groups. Alternatively or additionally, the hash function used in each queue-group may be calculated over a different respective set of fields of header 104. In some embodiments, the switch comprises at least one multi-queue queue-group and at least one single-queue queue-group. The single-queue queue-group may be used for packets that require no special ordering for controlling the cache performance at the destination, as will be described below.

For each queue-group of egress queues, scheduler 84 applies a suitable scheduling method, e.g., DRR as described above. In addition, scheduler 84 applies an arbitration scheme among the multiple queue-groups based on their respective priority levels. In an embodiment, scheduler 84 assigns respective quanta values to the DRR schedulers of the different respective queue-groups depending on their respective priority levels. Scheduler scans the queue-groups in a cyclic order, reads an amount of data from the currently selected egress queue in accordance with the respective quanta assigned, and then switches to the next queue-group in the scanning order.

As an example, consider a switch comprising two queue-groups denoted QG1 and QG2, having respective priority levels 2 and 4. In this example, the switch assigns DRR packet-based quanta values Q and 2Q to QG1 and QG2, respectively. In this example, scheduler 84 reads Q packets from a selected egress queue of QG1 followed by reading 2Q packets from a selected egress queue of QG2, and so on.

In the example embodiment above, scheduler 84 reads data from one selected egress queue in one queue-group before switching to a subsequent queue-group. In alternative embodiments, scheduler 84 may read data from two or more egress queues of the same queue-group (using DDR) and only then switch to the next queue-group in the scanning order.

Selective Packet Ordering Based on Underlying Protocols

In some embodiments, the packets received in switch 24A and that are destined to the destination network node are communicated end-to-end using various communication protocols. For example, some of these packets are communicated using the RDMA over Converged Ethernet (RoCE) protocol, whereas other packets are communicated using the Transmission Control Protocol (TCP).

In some embodiments, switch 24A is configured to order the packets transmitted to the destination network node so as to reduce the cache-miss rate only for certain communication protocols. In such embodiments, packets of a protocol that requires packet ordering are handled as described above, and for a protocol that does not require packet ordering, the switch allocates a dedicated egress queue.

Figure 3:
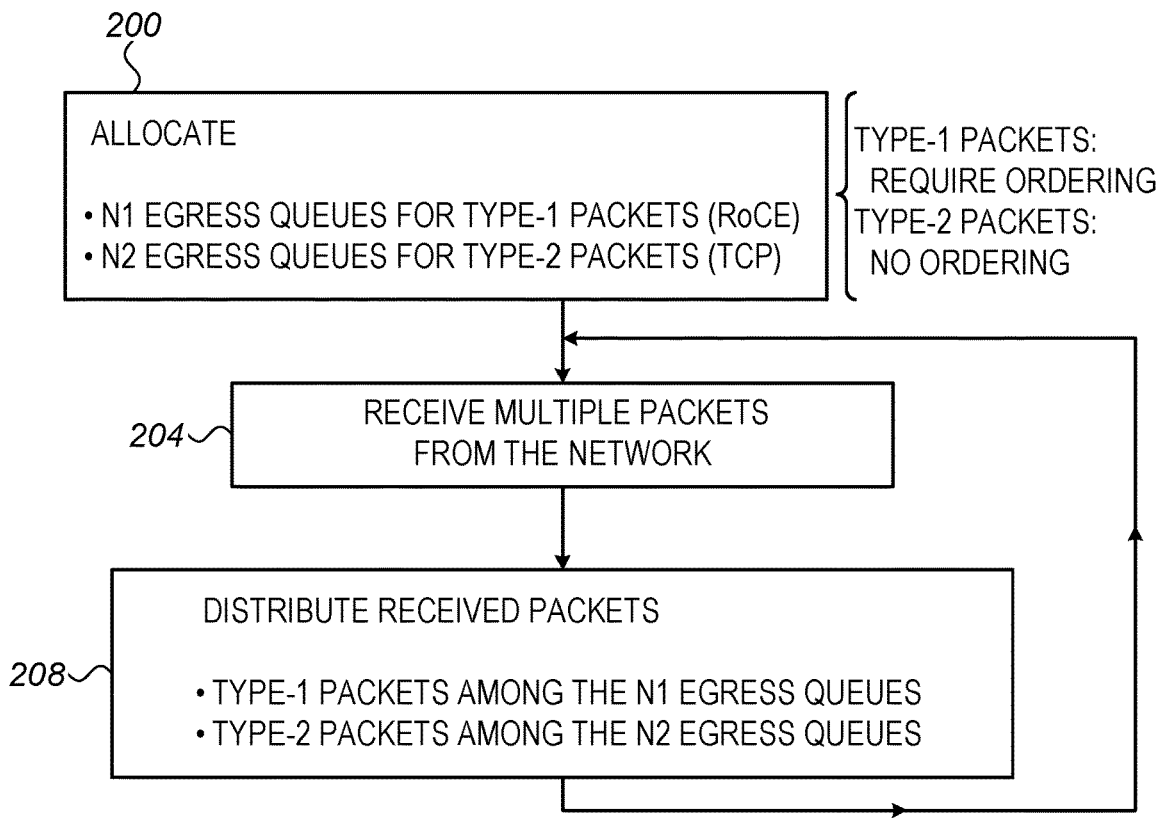
FIGS. 3 and 4 are flow charts that schematically illustrate respective methods for packet distribution and scheduling in a switch that supports multiple communication protocols, in accordance with an embodiment that is described herein.
Figure 4:
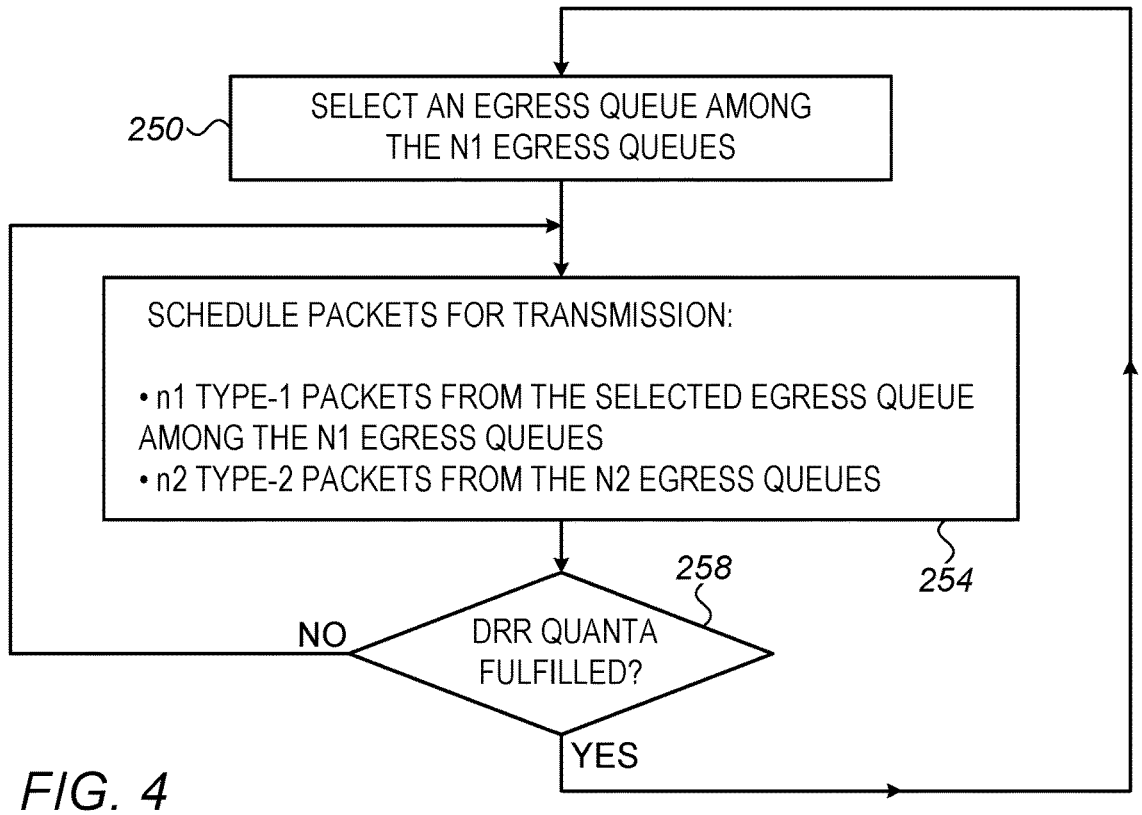

FIGS. 3 and 4 are flow charts that schematically illustrate respective methods for packet distribution and scheduling in a switch that supports multiple communication protocols, in accordance with an embodiment that is described herein. Some of the communication protocols supported require packet ordering for reducing cache-miss rate, as described above, whereas other communication protocols require no packet ordering, e.g., because these protocols are insensitive (or less sensitive) to packet delivery latency. In the present example we assume two packet types corresponding to two respective communication protocols. Packets denoted TYPE-1 (e.g., RoCE packets) require ordering, whereas packets denoted TYPE-2 (e.g., TCP packets) do not require packet ordering.

Assume, for example, that packet ordering is required for RoCE packets but not for TCP packets. With reference to FIG. 3, at a queue allocation step 200, the switch allocates a first queue-group comprising N1>1 egress queues for the RoCE packets, and further allocates a second queue-group comprising N2 egress queues for the TCP packets. In some embodiments, the second queue-group comprises a single queue, i.e., N2=1.

At a reception step 204, the switch receives multiple packets from the network. Some of the received packets are communicated using the RoCE protocol and some using TCP. At packet distribution step 208, distributor 82 distributes the received TYPE-1 (e.g., RoCE) packets among the N1 egress queues that were allocated within the first queue-group, e.g., using a hash function, as described above, and distributes the received TYPE-2 (e.g., TCP) packets among the N2 egress queues of the second queue-group. Different hush functions for distributing the TYPE-1 packets may be used at different times, e.g., to accommodate time-varying traffic. Distributor 82 may distribute the TYPE-2 packets using any suitable distribution scheme, e.g., using a Weighted Round Robin (WRR) scheme, with suitable weights assigned to the egress queues in the second queue-group. Following step 208 the distributor loops back to step 204 to receive subsequent packets.

Referring now to FIG. 4, at a queue selection step 250, scheduler 84 selects an Egress queue among the N1 egress queues of the first queue-group, e.g., using a suitable round robin method such as DRR. At a scheduling step 254, scheduler 84 reads a number n1 of packets from the egress queue selected at step 250, and additionally reads a number n2 of packets from one or more of the egress queues in the second queue-group.

In some embodiments, n1 and n2 are determined in accordance with predefined weights assigned to the TYPE-1 and TYPE-2 packets (or respective protocols), respectively. The scheduler may select the n2 packets from a single queue or from multiple queues of the second queue-group using any suitable selection scheme.

At a quanta checking step 258, the scheduler checks whether the DRR quanta assigned to the currently selected egress queue in the first queue-group is fulfilled, and if so, loops back to step 250 to select a subsequent egress queue of the first queue-group. Otherwise, the scheduler loops back to step 254 to schedule n1 additional packets from the currently selected egress queue of the first queue-group plus n2 packets from the second queue-group.

The embodiments described above are given by way of example, and other suitable embodiments can also be used. For example, although FIGS. 3 and 4 refer to two packet types, e.g., in accordance with the RoCE and TCP protocols, the methods of FIGS. 3 and 4 are applicable to a number of communication protocols larger than two, and to suitable protocol types other than RoCE and TCP.

Although in the embodiments described above switch 24A can reside anywhere along the path between the source and destination network nodes, the disclosed techniques may be especially effective when switch 24A feeds the target network adapter directly, and assuming that lossless flow control is enabled between the network adapter and switch. Moreover, two or more switches along the path between the source and destination nodes may implement the features of switch 24A, including the distribution and scheduling schemes described above.

Although the embodiments described above refer mainly to a network switch, the disclosed techniques are similarly applicable to other suitable network elements such as routers and bridges.

Although the embodiments described herein mainly address ordering, in a network element, packets destined a destination network node, aiming to improve destination cache performance, the methods and systems described herein can also be used in other applications, such as in a device that comprises a large memory and a small-sized cache memory, and ordering the accesses to the cache memory (e.g., by a CPU) to reduce cache miss events.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network switch, comprising:
multiple ports configured to communicate with a communication network; and
switch circuitry configured to:
receive via the ports multiple packets, which are destined to a destination network node, wherein:
each packet specifies one or more attributes;
the attributes are used by the destination network node as cache keys for on-demand fetching of context items into a cache memory of the destination network node, wherein the cache memory has a storage capacity that is limited for storing only a partial subset of all available context items; and
each context item fetched to the cache memory is used in processing, by the destination network node, one or more packets sent from the network switch;
set an order of a sequence in which the received packets are to be ordered and sent to the destination network node, wherein the order aims to place packets that access a common context item in proximity to one another in the sequence, thereby reducing a rate of the on-demand fetching of the context-items at the destination network node; and
forward the received packets to the destination network node, via the ports, in accordance with the ordered sequence.

2. The network switch according to claim 1, further comprising multiple queues for storing packets awaiting transmission to the communication network, wherein the switch circuitry is configured to order the received packets by distributing at least some of the received packets that are associated with a same cache key to a common queue.

3. The network switch according to claim 2, wherein the switch circuitry is configured to scan the multiple queues and to read from each queue visited multiple packets, if available, before switching to read a subsequent queue among the multiple queues.

4. The network switch according to claim 2, wherein the switch circuitry is configured to read the multiple queues in accordance with a Deficit Round Robin (DRR) schedule scheme that assigns to each of the multiple queues a quanta parameter of multiple packets.

5. The network switch according to claim 2, wherein the received packets are associated with multiple respective priority levels, wherein the switch circuitry is configured to distribute the received packets to multiple respective queue-groups that each comprises two or more of the multiple queues, based on the respective priority levels, and to read multiple packets from a selected queue in one queue-group before switching to selecting a subsequent queue for reading in another queue-group.

6. The network switch according to claim 2, wherein the switch circuitry is configured to receive additional packets that are destined to the destination network node, wherein the additional packets require no access to any cached context item at the destination network node, and to distribute the additional packets to a dedicated queue that is separate from the queues allocated for storing packets to be ordered.

7. The network switch according to claim 6, wherein the switch circuitry is configured to read the queues by alternating reading one or more packets from a selected queue among the queues storing the packets to be ordered, and one or more packets from the dedicated queue.

8. The network switch according to claim 1, wherein the context items in the cache memory comprise information for translating between destination virtual addresses carried in headers of the received packets and physical addresses of a memory of the destination network node in which a payload part of the received packets is to be stored, and wherein the attributes used by the destination network node as the cache keys comprise the virtual addresses.

9. The network switch according to claim 1, wherein the received packets are organized in Remote Direct Memory Access (RDMA) messages for directly accessing data in the memory of the destination network node.

10. The network switch according to claim 9, wherein the communication network comprises an InfiniBand fabric, and wherein the RDMA messages comprise messages communicated in accordance with a RDMA over Converged Ethernet (RoCE) protocol.

11. A method for communication, comprising:

in a network switch that comprises multiple ports for communicating with a communication network, receiving via the ports multiple packets, which are destined to a destination network node, wherein:

each packet specifies one or more attributes, the attributes are used by the destination network node as cache keys for on-demand fetching of context items into a cache memory of the destination network node, wherein the cache memory has a storage capacity that is limited for storing only a partial subset of all available context items, and each context item fetched to the cache memory is used in processing, by the destination network node, one or more packets sent from the network switch, setting an order of a sequence in which the received packets are to be ordered and sent to the destination network node, wherein the order aims to place packets that access a common context item in proximity to one another in the sequence, thereby reducing a rate of the on-demand fetching of the context-items at the destination network node; and forwarding the packets to the destination network node, via the ports, in accordance with the ordered sequence.

12. The method according to claim 11, wherein the network switch further comprises multiple queues for storing packets awaiting transmission to the communication network, wherein setting the order comprises distributing at least some of the received packets that are associated with a same cache key to a common queue.

13. The method according to claim 12, wherein setting the order comprises scanning the multiple queues and reading from each queue visited multiple packets, if available, before switching to read a subsequent queue among the multiple queues.

14. The method according to claim 12, wherein setting the order comprises reading the multiple queues in accordance with a Deficit Round Robin (DRR) schedule scheme that assigns to each of the multiple queues a quanta parameter of multiple packets.

15. The method according to claim 12, wherein the received packets are associated with multiple respective priority levels, wherein setting the order comprises distributing the received packets to multiple respective queue-groups that each comprises two or more of the multiple queues, based on the respective priority levels, and reading multiple packets from a selected queue in one queue-group before switching to selecting a subsequent queue for reading in another queue-group.

16. The method according to claim 12, and comprising receiving additional packets that are destined to the destination network node, wherein the additional packets require no access to any cached context item at the destination network node, and distributing the additional packets to a dedicated queue that is separate from the queues allocated for storing packets to be ordered.

17. The method according to claim 16, wherein setting the order comprises reading the queues by alternating reading one or more packets from a selected queue among the queues storing the packets to be ordered, and one or more packets from the dedicated queue.

18. The method according to claim 11, wherein the context items in the cache memory comprise information for translating between destination virtual addresses carried in headers of the received packets and physical addresses of a memory of the destination network node in which a payload part of the received packets is to be stored, and wherein the attributes used by the destination network node as the cache keys comprise the virtual addresses.

19. The network switch according to claim 11, wherein the received packets are organized in Remote Direct Memory Access (RDMA) messages for directly accessing data in the memory of the destination network node.

20. The method according to claim 19, wherein the communication network comprises an InfiniBand fabric, and wherein the RDMA messages comprise messages communicated in accordance with a RDMA over Converged Ethernet (RoCE) protocol.

* * * * *